US010251102B2

(12) United States Patent
Levinkron et al.

(10) Patent No.: US 10,251,102 B2
(45) Date of Patent: Apr. 2, 2019

(54) OVERSHOOTING CELL DETECTION (71) Applicant: Cisco Technology, Inc., San Jose, CA (US)

(72) Inventors: Ohad Levinkron, Holon (IL); Yaron Kassner, Hod Hasharon (IL); Sharon Taib, Afula (IL); Natalia Romero, Tel Aviv (IL); Asi Assayag, Holon (IL); Mohamed Hegaze, Tamra (IL); Lior Orgad, Rishon Letsion (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/811,729

(22) Filed: Nov. 14, 2017

(65) Prior Publication Data

US 2018/0160345 A1 Jun. 7, 2018

Related U.S. Application Data (60) Provisional application No. 62/430,951, filed on Dec. 7, 2016.

(51) Int. Cl.
*H04W 24/02* (2009.01)
*H04W 36/00* (2009.01)
(Continued)

(52) U.S. Cl.
CPC ........ *H04W 36/0083* (2013.01); *G06F 9/542* (2013.01); *H04L 41/16* (2013.01);
(Continued)

(58) Field of Classification Search
CPC ............ H04W 36/0083; H04W 24/02; H04W 36/0016; H04W 24/08; H04L 41/16; G06F 9/542; G06N 3/02
See application file for complete search history.

(56) References Cited

U.S. PATENT DOCUMENTS

2013/0325772 A1    12/2013  Báder
2014/0162682 A1*   6/2014  Tafreshi ................ H04W 24/02
                                                    455/456.1
(Continued)

FOREIGN PATENT DOCUMENTS

WO    2008014818    2/2008
WO    2016016782    2/2016

OTHER PUBLICATIONS

Jin, Yang; AI-Enabled Mobile Networks (Aug. 2016).
(Continued)

*Primary Examiner* — Chuong A Ngo (57) ABSTRACT

In one embodiment, a system includes: an input/output (I/O) module operative to receive operational data for features associated with at least inter-cell performance in a mobile network, processing circuitry, a model generator application to be executed by the processing circuitry and operative to: use at least one prediction model to analyze training sets comprising examples of values for the features for at least overshooting cells, and to generate a scoring model for detection of the overshooting cells from among cells in the mobile network, and a boomer detection application to be executed by the processing circuitry and operative to: use the scoring model with the operational data to detect the overshooting cells from among cells in a mobile network, and reduce interference by the overshooting cells.

20 Claims, 3 Drawing Sheets (51) Int. Cl.
  *H04L 12/24*  (2006.01)
  *G06F 9/54*   (2006.01)
  *G06N 3/02*   (2006.01)
  *H04W 24/08*  (2009.01)

(52) U.S. Cl.
  CPC ............. *H04W 24/02* (2013.01); *G06N 3/02* (2013.01); *H04W 24/08* (2013.01); *H04W 36/0016* (2013.01)

(56) References Cited

U.S. PATENT DOCUMENTS

2016/0029253 A1*  1/2016  Sarkar ............... H04W 36/0016
                                                       455/436
2016/0165472 A1*  6/2016  Gopalakrishnan .... H04W 24/10
                                                       455/67.11

OTHER PUBLICATIONS

Latif, Siddiq et al.; Artificial Intelligence as an Enabler for Cognitive Self-Organizing Future Networks; arXiv preprint arXiv:1702.02823 (2017).

Sallent, O. et al.: Automatic Detection of Sub-Optimal Performance in UMTS Networks Based on Drive-Test Measurements; 2011 7th International Conference on Network and Service Management, Paris, 2011, pp. 1-4.

International Search Report and Written Opinion, dated Feb. 19, 2018 in a corresponding WO application (PCT/IB2017/057087).

* cited by examiner

OVERSHOOTING CELL DETECTION

RELATED APPLICATION INFORMATION

The present application claims the benefit of priority from U.S. Provisional Patent Application Ser. No. 62/430,951, filed on Dec. 7, 2016.

FIELD OF THE INVENTION

The present invention generally relates to the detection of overshooting cells in a radio access network (RAN).

BACKGROUND OF THE INVENTION

Overshooting cells pose a major problem in Universal Mobile Telecommunications System (UMTS) radio networks. These cells, often referred to as "boomers", are cells with larger than necessary coverage areas. As a result, boomer cells may cause interference in other cells of the RAN, thereby impacting on Quality of Experience (QoE) for both users they serve and users in surrounding cells. Common estimates are that 5-15% of all macro cells in a UMTS network are boomer cells.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Overview

A system includes: an input/output (I/O) module operative to receive operational data for features associated with at least inter-cell performance in a mobile network, processing circuitry, a model generator application to be executed by the processing circuitry and operative to: use at least one prediction model to analyze training sets comprising examples of values for the features for at least overshooting cells, and to generate a scoring model for detection of the overshooting cells from among cells in the mobile network, and a boomer detection application to be executed by the processing circuitry and operative to: use the scoring model with the operational data to detect the overshooting cells from among cells in a mobile network, and reduce interference by the overshooting cells.

Detailed Description of Example Embodiments

Due to the impact of overshooting cells on QoE, detecting and mitigating their effect is a significant issue in mobile networks, and is therefore a primary target for RAN optimizations. Detecting overshooting cells, however, may be difficult. Accurate, high-resolution radio measurements for the performance of individual cells are hard to attain and analyze, and aggregated counters that are commonly available may be similarly hard to analyze for detecting individual overshooting cells. The common practice is for radio engineers to use a few rough indicators, combined with years of experience and some trial and error, to locate these cells and mitigate the problem. However this process may be tedious and error prone.

In accordance with embodiments described herein, an overshooting cell detection system may employ a scoring mechanism to provide autonomous detection of such potentially interfering cells, thereby reducing reliance on manual detection procedures, and increasing efficiency.

The overshooting cell detection system may use a variety of inter-cell features (i.e., features related to communication between at least two cells) and/or intra cell features, either singly or in various combinations, to model typical "overshooting indicators" (OIs) in order to detect potentially interfering overshooting cells. The system may evaluate the features in light of actual cell data collated over a configurable period of time, e.g., 24 hours, 48 hours, etc., and then autonomously adjust relevant settings to reduce the coverage area for cells identified as boomers. Examples of such features may include:

Inbound neighbors: This feature may reference the number of neighboring cells with handovers to a source cell, i.e., the cell being evaluated.

Outbound neighbors: This feature may reference the number of neighboring cells with handovers from the source cell. It will be appreciated that a relatively high number of outbound neighbors may be indicative of an overshooting cell. The value for outbound neighbors may also be used in combination with the value for inbound neighbors—if there are significantly more outbound neighbors than inbound neighbors it may be indicative of an overshooting cell. It will be appreciated that the outbound neighbors OI may be calculated based on data gathered from the receiving cells. In accordance with embodiments described herein, the cells to be counted for the purposes of determining the number of inbound/outbound neighbors may be filtered or weighted to some degree by the imposition of a minimum percentage and/or a minimum absolute number of instances before a given cell may be counted as an incoming/outbound neighbor for a second cell. For example, if handovers from the second cell account for less than 2% of the all of the handovers to the given cell, the second cell may not be considered an inbound neighbor of the given cell. Alternatively, or in addition, a minimum number of handovers (i.e., in terms of an absolute number as opposed to a percentage) may be defined in order to filter out less significant neighbor relationships. It will be appreciated that in accordance with embodiments described herein, such filtering may be applied in a generally similar manner to some or all of the other features described herein.

"Missing Neighbor" events: This feature may reference "missing neighbor" events associated with the source cell. An outbound missing neighbor event may represent a report by a user equipments (UE) to a serving cell (i.e., the source cell) that a cell it detects as strong enough for a potential handover, in the "reporting range" is not defined as a neighbor of the source cell, and therefore it cannot perform the handover. An incoming missing neighbor event may represent the same situation in reverse, where the UE is in the non-neighboring cell and detects the serving cell of the previous example. It will be appreciated that the missing events may also be calculated, at least in part, based on data from other cells in the network. For example, the cell's scrambling code may be used to associate the data from the other cells with the cell being evaluated.

Missing neighbors: This feature may reflect the total number of inbound/outbound missing neighbors as per the missing neighbor events discussed hereinabove. The number of missing neighbors may be calculated according to the number of different scrambling codes reported for the missing neighbor events, where each reported scrambling code generally represents a different cell.

"Unmonitored Neighbor" events: This feature may be similar to the missing neighbor events feature, but with the difference that the RAN knows to match the reported target scrambling code with a specific cell. This may occur when the target scrambling code is in the source cell's neighbor list; it will be appreciated that this feature may not be available from all RAN vendors. Similarly to neighbor (handover) reports and "missing neighbor" events the system may also count incoming/outgoing cells/events.

Unmonitored total degree: This feature may reference the number of cells with either incoming or outgoing "Unmonitored Neighbor" relationships with the cell.

Total in degree: This feature may represent the number of cells with inbound relations of any kind to the cell, i.e., neighboring cells with non-zero handover attempts, missing neighbors, or unmonitored neighbors, regardless of weight. It will be appreciated the larger the value for total in degree, the greater the indication that the source cell is overshooting.

Cells in PD95/PD99: This feature may represent the number of cells that are within a coverage area effectively defined by the propagation delay (PD) for communicating with 95% or 99% of the UEs that may be reached by the source cell. The system derives a histogram of user counts (specifically, call initiations) for each cell using data aggregated in various distance bins (depending on vendor and/or configuration). The system uses the histogram to estimate the 95th and 99th percentiles, which reflect to some extent "how far" the cell reaches. It will be appreciated that propagation delay may therefore effectively serve as a proxy for the furthest distance of the source cell's transmissions. Accordingly, the larger the value for PD95 or PD99, the greater the indication that the source cell is overshooting. It will be appreciated that the use of PD95 and PD99 are exemplary; in accordance with embodiments described herein, the percentiles for determining a proxy for the furthest distance of a source cell's transmission may be configurable. For example, this feature ay alternatively use the 97th or 98th percentile, etc.

Cluster size: This feature may represent the number of cells that have a significant relationship with the source cell, based, for example, on analysis of the inbound/outbound neighbors, missing neighbors, and/or unmonitored neighbors. A relationship may be deemed to be significant if its relative weight for inbound/outbound signals is above a given threshold. For example, for neighboring cells a threshold weight for a significant relationship may be defined as 2% of the total events of that type in the source cell or the neighboring cell; for non-neighboring cells a threshold weight may be defined as 5% of the total events of that type in the source cell or the non-neighboring cell. It will be appreciated that the larger the cluster size, the greater the indication that the source cell is an overshooter.

In accordance with embodiments described herein, the cell cluster of neighboring cells with significant relationships with the source cell may be used to normalize the results of some, or all, of the features for a source cell in light of its operating context. For example:

Normalized PD99: This feature represents the source cell's PD99 normalized to the average PD99 of the cells in the cluster. As with non-normalized PD99, the greater the source cell's PD99 relative to that of the cells in its cluster, the greater the indication that the cell is an overshooter. The normalization may calculated as follows: (The source cell's PD99−the average of the PD99 for all of the cluster's cells)/the standard deviation for the cluster's distribution. Accordingly, standard deviation=0, then the normalized PD will also be 0. It will be appreciated that a normalized PD95 may be derived in a generally similar manner.

Normalized total in degree: This feature represents the source cell's total in degree value, normalized to that of all the cells in the cluster. It will be appreciated that the greater the value relative to that of the cells in its cluster, the greater the indication that the cell is an overshooter. The normalization may be calculated as follows: The source cell's "total in degree" value/median of the "total in degree" values for the cells in the cluster.

Figure 1:
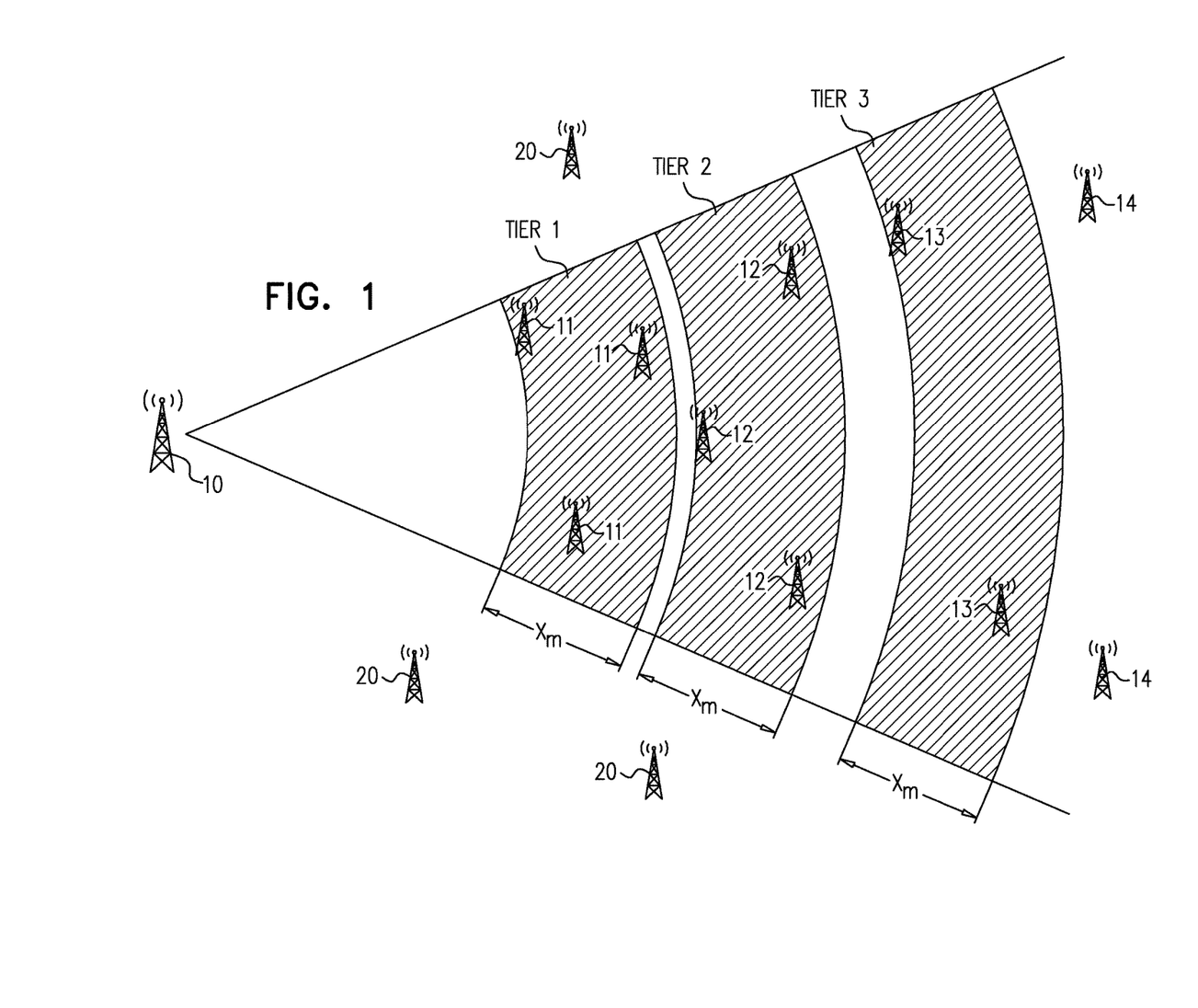
FIG. 1 is a pictorial illustration of cells grouped into tiers in accordance with embodiments described herein.

In accordance with embodiments described herein, the system may also support the definition of tiers for evaluating the likelihood that a source cell is an overshooter. Reference is now made to FIG. 1, which illustrates tiered cells for an exemplary source cell 10. As depicted in FIG. 1, source cell 10 may transmit in an arc in the general direction of cells 11, 12, 13 and 14, where cells 11 are the closest cells in the transmission arc. It will be appreciated that the transmission arc of FIG. 1 may represent a simplified, exemplary potential cell "beam width" representing a rough estimate of a presumed coverage area for source cell 10. In practice, the coverage area may be defined as a function of the radius (e.g., as derived according to propagation delay), angle (e.g., from antenna beam width), and azimuth (e.g., from antenna azimuth). It will be appreciated that cells typically do no not have full 360 degree coverage, but rather a slice of coverage as determined by the transmission arc. It will similarly be appreciated that in operation, a cell's coverage "footprint" may be affected by a variety of technical and/or environmental factors and may not therefore actually approximate an arc as depicted in FIG. 1.

Tier 1 for source cell 10 may be defined as starting from the location of the nearest cell 11 (to the source cell) and further extending a distance of "X" meters (hereinafter referred to as "Xm"). In accordance with an exemplary embodiment described herein, Xm may be defined as 500 meters. It will be appreciated however, that the embodiments described herein may support other values for Xm. Tier 2 may be defined as starting from the next nearest cell after the cells in Tier 1, i.e., the nearest cell 12, and also further extending a distance of Xm. Tier 3 may be defined as starting from the next nearest cell after the cells in Tier 2, i.e., the nearest cell 13, and also further extending a distance of Xm. Accordingly, the depicted cells 11 are in Tier 1; the depicted cells 12 are in Tier 2; and the depicted cells 13 are in Tier 3. It will be appreciated that additional tiers may be defined in similar manner, such that cells 14 would be in Tier 4, etc. Tier 5 (not shown) would similarly be defined as the cells within an Xm wide slice of the source cell's transmission arc that extends from the closest cell following Tier 4. Other tiers may be defined in a generally similar manner. It will similarly be appreciated that since cells 20 are not in the transmission arc of source 10, they are not associated with any of the tiers. It will also be appreciated that Xm may be a measurement of "distance in the air" without regard for topography. For example, when moving from point A to point B on the ground, the "ground distance" may be affected by whether or not the intervening terrain has a hill, valley, or flat ground. In accordance with the embodiment of FIG. 1, the tiers may be defined as smooth arcs according to distance in the air, where specific topography may be ignored.

A number of features may be defined as a function of the tiers. For example:

Tier N relationships: This feature represents the number of relationships that the source cell has with cells in Tier N, where N denotes one or the defined tiers. In an exemplary embodiment described herein, N may equal 5. It will be appreciated that the more cells at Tier 5 with relationship with source cell 10, the more likely that source cell 10 is overshooting.

Unmonitored incoming at Tier>I: This feature represents the number of cells in Tier I+1 and beyond with incoming "Unmonitored Neighbor" relationships with source cell 10. In an exemplary embodiment described herein, I may equal 3. It will be appreciated that the more cells at Tier 4 and beyond with incoming "Unmonitored Neighbor" relationships with source cell 10, the more likely that source cell 10 is overshooting.

Neighbor weight above threshold at Tier>J: Neighbor weight may be calculated as the number of handovers from a source cell to a target cell divided by the total number of handovers from the source cell to all targets cells. This feature represents the sum of weights for target cells in Tier J+1 and beyond above a threshold weight. In an exemplary embodiment described herein, J may equal 3. It will be appreciated that the larger the sum weights from Tier 4 and beyond, the more likely that source cell 10 is overshooting.

In accordance with embodiments described herein, the system may also employ artificial intelligence (AI), machine learning, and/or any suitable prediction model to provide an expert system that may function according to the base logic, methods and heuristics that may be implicitly used by a human expert.

For example, the system may be fed with training sets comprising numerous examples of features values for known overshooting and non-overshooting cells. The system may then employ machine learning algorithms, such as decision tree learning, to learn from the examples in the training and to generate a model for scoring the component OI values and inferring a classification result (i.e., either "overshooting" or "not overshooting") when used to evaluate an unknown example. In accordance with embodiments described herein, adaptive boosting algorithms may be employed to augment the decision tree learning. It will be appreciated that the embodiments described herein are not necessarily limited to the use of decision trees with adaptive boosting algorithms. For example, in accordance with some embodiments described herein, a random forest algorithm may be used instead of, or in addition to, decision tress and/or adaptive boosting. Other AI fields may also be applied, such as, for example, deep learning, and/or other Support Vector Machines (SVM) for machine learning or other models.

Accordingly, in operation a population of cells in the network are scored in accordance with the determined model, where each of the features may be input to a machine learning process and then weighted differently in accordance with the results of the machine learning. The system may sort the scored cells and the overshooting and non-overshooting cells may be identified in accordance with a "decision threshold" defined for a given score.

In accordance with embodiments described herein, the system may be operative to employ Remote Electrical Tilt (RET) commands to autonomously remedy overshooting cells. Common pilot channel (CPICH) settings may also be adjusted to reduce the range at which UEs will select the overshooting cell.

Figure 2:
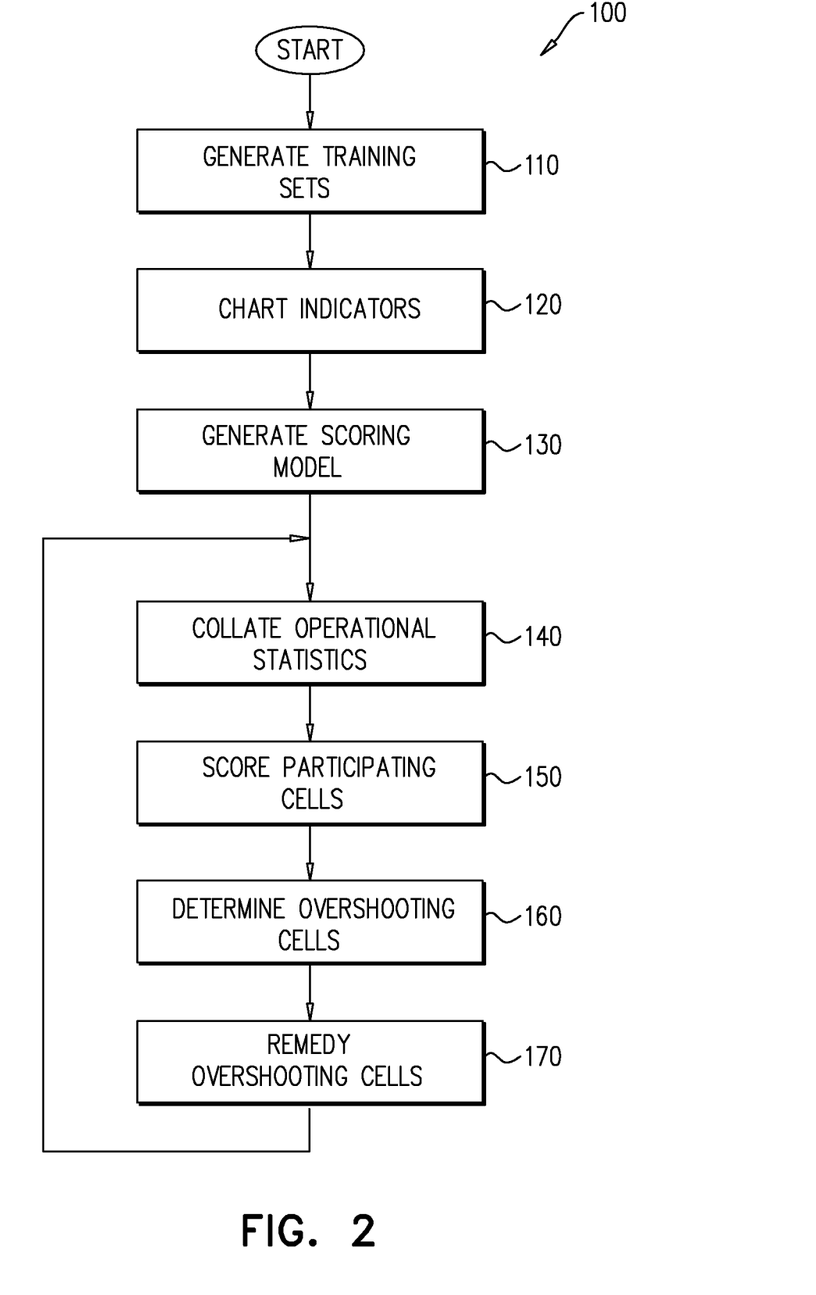
FIG. 2 is a flow chart of an exemplary overshooting cell detection process, constructed and operative in accordance with embodiments described herein.

Reference is now made to FIG. 2, which is a flow chart of an exemplary overshooting cell detection process 100, constructed and operative in accordance with embodiments described herein. The system may generate (step 110) training sets based on actual performance data for known overshooting and non-overshooting cells. It will be appreciated that the selection and labelling of the known overshooting and non-overshooting cells may be based on manual inspection.

The system may optionally chart (step 120) some or all of the overshooting indicators described hereinabove to provide a visual representation of a presumptive baseline for detecting an overshooting cell according to each overshooting indicator.

The system may employ one or more machine learning algorithms and/or prediction models to generate (step 130) a scoring model based on some or all of the overshooting indicators. In accordance with some embodiments, the system may employ decision tree learning optionally coupled with adaptive boosting algorithms to generate the scoring model. As noted hereinabove, the system may employ other machine learning algorithms and/or prediction models as well. The scoring model will include at least some of the overshooting indicators (i.e., features) described hereinabove, where values for each of the included overshooting indicators may be weighted and/or filtered in order to provide an overall score.

In operation, the system may continually or periodically collate (step 140) actual performance data from a population of cells and the cells with which they are in at least some form of communication as necessary to evaluate the overshooting indicators in the scoring model. For example, the actual performance data may be collated from vendor-supplied statistics and/or provided by a mobile network's self-optimizing network (SON) function. The system may then score (step 150) each of the cells using the scoring model generated in step 130.

Based on the scores for each of the cells, the system may then determine (step 160) which of the cells are overshooting cells. The system may attempt to autonomously remedy (step 170) an overshooting cell's issues. For example, the system may employ RET commands to adjust the transmission strength and/or patterns of an overshooting cell. Common pilot channel (CPICH) settings may also be adjusted to reduce the range at which UEs will select the overshooting cell. It will be appreciated that the system may employ existing SON functionality to implement such remedies. For example, instead of directly communicating with the overshooting cells, the system may forward instructions and/or at least recommendations to a SON server. The SON server may then provide the RET commands and/or CPICH settings to the overshooting cells. Control may then return to step 140.

It will be appreciated that process 100 may also comprise feedback and adjustment steps, where the system may assess the efficacy of step 170 and respond accordingly. The system may also periodically re-perform steps 110-130 in order to update the scoring model based on new actual performance data and findings for the participating cells. It will further be appreciated that process 100 may be effectively divided into two processes. Steps 110-130 may represent a setup process that may be repeated to perform periodic and/or on-demand updates; whereas steps 140-170 may be performed as a regularly scheduled operational process.

Figure 3:
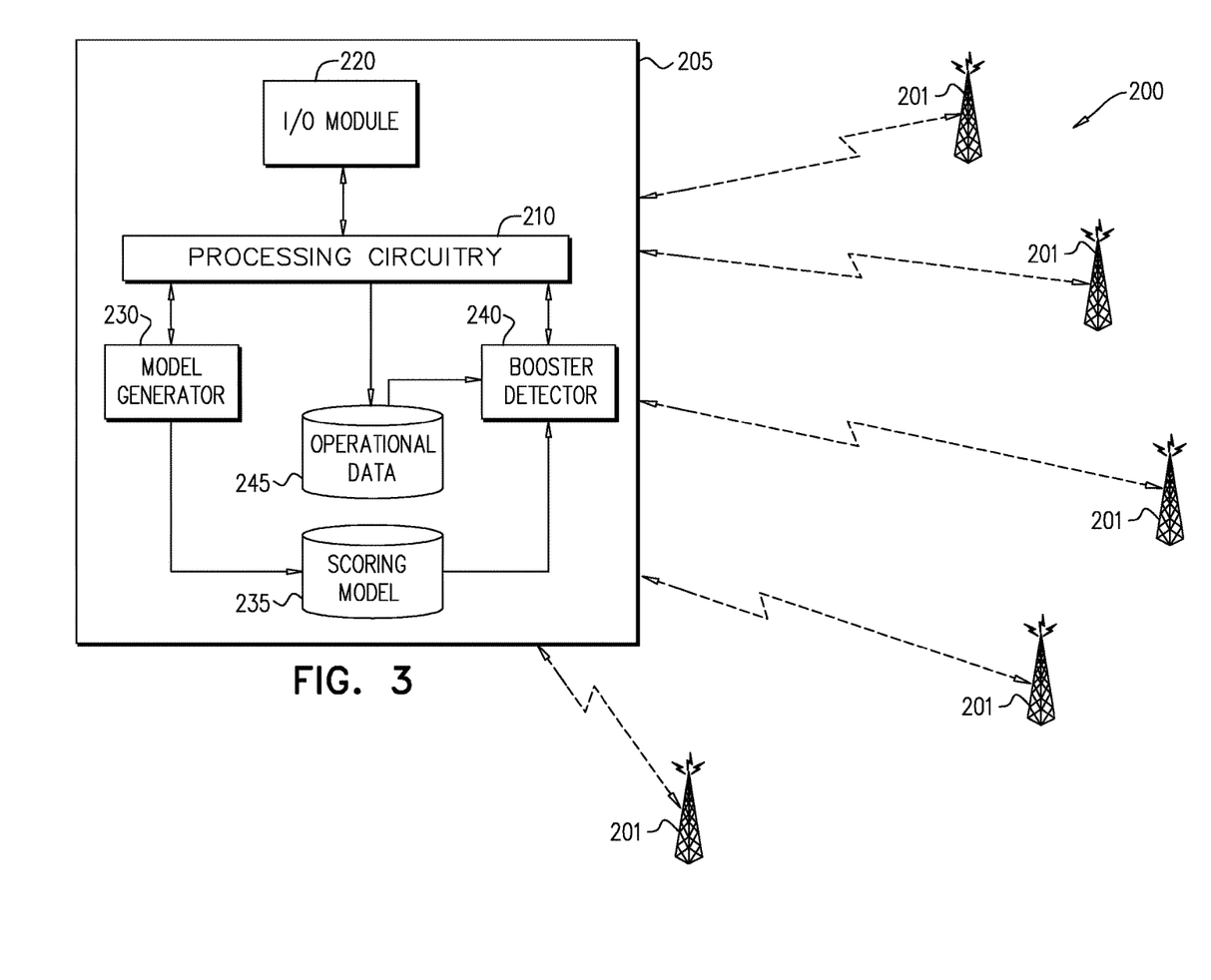
FIG. 3 is a schematic illustration of a boomer detector server, configured and operative in accordance with embodiments described herein to at least perform the process of FIG. 2.

Reference is now made to FIG. 3 which is a schematic illustration of a boomer detector server 205, configured and operative in accordance with embodiments described herein to at least detect overshooting cells from among cells 201 in mobile network 200 as described with respect to process 100 in FIG. 2. Server 205 may be implemented using any suitable computing device(s) that may support the execution of boomer cell detection as described herein. For example, server 205 may implemented using hardware, software, and/or firmware on a multi-purpose personal computer, computer tablet, or smartphone. Server 205 may also be implemented on a communications router or switch, or on a dedicated Internet of Things (IoT) device. Server 205 may also be implemented as an integrated component on one or more of the elements of mobile network 200, such as, for example, a mobility management entity (MME), a gateway (e.g., PGW, SGW), or a mobile base station (e.g., eNodeB).

Server 205 comprises processing circuitry 210, input/output (I/O) module 220, model generator 230, scoring model 235, boomer detector 240, and operational data 245. Model generator 230, scoring model 235, boomer detector 240, and operational data 245 may be implemented using any suitable memory for storing software and/or operational data, such as an optical storage medium, a magnetic storage medium, an electronic storage medium, and/or a combination thereof. It will be appreciated that the memory, or parts thereof, may be implemented as a physical component of server 205 and/or as a physical component of one or more secondary devices in communication with server 205.

Processing circuitry 210 may be operative to execute instructions stored in the memory. For example, processor 210 may be operative to execute model generator 230 and/or boomer detector 240. It will be appreciated that processing circuitry 110 may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. It will similarly be appreciated that server 205 may comprise more than one instance of processing circuitry 210. For example, one such instance of processing circuitry 210 may be a special purpose processor operative to execute model generator 230 and/or boomer detector 240 to perform some, or all, of the processing logic of process 100 as depicted in FIG. 2.

I/O module 220 may be any suitable software or hardware component such as a universal serial bus (USB) port, disk reader, modem or transceiver that may be operative to use protocols such as are known in the art to communicate either directly, or indirectly, with elements of mobile network 200, such as, for example, a base station, an MME, a gateway, etc. over a communications network such as, for example, a backbone network, the Internet, or via a WiFi connection. It will be appreciated that the embodiments described herein may also support configurations where some or all of the communications between I/O module 220 and elements of mobile network 200 are brokered by a local server and forwarded to I/O module 220 over the Internet, a local area network, and/or a suitable wireless technology. At least some of the functionality attributed herein to server 205 may be also performed on such a local server. It will similarly be appreciated that since I/O module 220 is operative to communicate with elements of mobile network 200, the physical location of server 205 may not necessarily be within close proximity of any specific element(s) of mobile network 200.

Model generator 230 may be an application implemented in hardware, firmware, or software that may be executed by processing circuitry 210 to at least perform steps 110-130 of process 100 (FIG. 2) as described hereinabove to generate scoring model 235. Boomer detector 240 may be an application implemented in hardware, firmware, or software that may be executed by processing circuitry 210 to use scoring model 235 and actual performance data, e.g., operational data 245, to at least perform steps 140-170 of process 100 (FIG. 2) as described hereinabove to autonomously detect and remedy overshooting cells in mobile network 200.

It is appreciated that software components of the embodiments of the disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the disclosure.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable subcombination.

It will be appreciated by persons skilled in the art that the embodiments of the disclosure are not limited by what has been particularly shown and described hereinabove. Rather the scope of the embodiments of the disclosure is defined by the appended claims and equivalents thereof:

What is claimed is:

1. A system comprising:
    an input/output (I/O) module operative to receive operational data for features associated with at least inter-cell performance in a mobile network, wherein at least one of said features represents at least a relationship between a given cell and one or more tiered cells for each tier of a plurality of tiers, wherein a coverage area for said given cell is organized into said plurality of tiers based on physical distance from said given cell, wherein a first tier of said tiers begins from a first cell closest to said given cell and extends for a configurable distance, and succeeding tiers from said tiers begin from a next cell closest to a preceding tier from among said tiers and extend for said configurable distance;
    processing circuitry;
    a model generator application to be executed by said processing circuitry and operative to:
        use at least one prediction model to analyze training sets comprising examples of values for said features for at least overshooting cells, and
        to generate a scoring model for detection of said overshooting cells from among cells in said mobile network; and
    a boomer detection application to be executed by said processing circuitry and operative to:
        use said scoring model with said operational data to detect said overshooting cells from among cells in a mobile network, and
        reduce interference by said overshooting cells.

2. The system according to claim 1 wherein:
    said at least one prediction model is a decision trees machine learning algorithm modified by an adaptive boosting algorithm.

3. The system according to claim 1 wherein:
said boomer detection application is operative to filter said operational data for at least one of said features for a given cell in said mobile network according to a minimum percentage of total interaction by said given cell with individual other cells.

4. The system according to claim 1 wherein:
said boomer detection application is operative to filter said operational data for at least one of said features for a given cell in said mobile network according to a minimum number of interactions between said given cell and individual other cells.

5. The system according to claim 1 wherein at least one of said features represents a number of neighboring cells for a given cell in said mobile network, wherein said neighboring cells have a successful handover relationship with said given cell.

6. The system according to claim 1 wherein at least one of said features is associated with inbound handover activity for a given cell in said mobile network.

7. The system according to claim 1 wherein at least one of said features is associated with outbound handover activity for a given cell in said mobile network.

8. The system according to claim 1 wherein at least one of said features represents a number of handover events.

9. The system according to claim 8 wherein said handover events are successful.

10. The system according to claim 8 wherein said handover events are unsuccessful.

11. The system according to claim 1 wherein at least one of said features represents the number of cells that are within a coverage area for a given cell, wherein said coverage area is defined according to a proxy for distance from said given cell, wherein said proxy for distance from said given cell is in accordance with a configurable percentile for propagation delay (PD) of successful communications by said given cell with user equipments (UEs).

12. The system according to claim 1 wherein at least one of said features is a cluster size for a given cell, wherein said cluster size represents a number of other cells in said mobile network with which said given cell has significant interaction, wherein said significant interaction is defined as a configurable percentage of all inter-cell interaction by said given cell.

13. The system according to claim 12 wherein a normalized feature is derived from at least a second feature from among said features, according to feature values for said other cells in said cluster.

14. The system according to claim 1 wherein at least one of said features is total in degree for a given cell, wherein said total in degree represents a number of all other cells in said mobile network with which said given cell has interaction.

15. The system according to claim 1 wherein said boomer detection application is operative to reduce interference by said overshooting cells by at least one of:
using remote electrical tilt (RET) commands to adjust antenna settings for said overshooting cells; or
adjusting common pilot channel (CPICH) settings to reduce a range at which a UE will select said overshooting cells.

16. The system according to claim 1 wherein said training sets further comprise examples of values for said features for at least non-overshooting cells.

17. A method for detecting overshooting cells in a mobile network, the method performed on a computing system and comprising:
generating training sets based on historical performance data for known overshooting and non-overshooting cells;
generating a scoring model based on a multiplicity of overshooting indicators, wherein at least one of said multiplicity of overshooting indicators represents at least a relationship between a given cell and one or more tiered cells for each tier of a plurality of tiers, wherein a coverage area for said given cell is organized into said plurality of tiers based on physical distance from said given cell, wherein a first tier of said tiers begins from a first cell closest to said given cell and extends for a configurable distance, and succeeding tiers from said tiers begin from a next cell closest to a preceding tier from among said tiers and extend for said configurable distance; wherein values for each of said multiplicity of overshooting indicators are weighted in order to provide an overall score;
collating actual performance data from a population of cells in operation;
scoring each of said cells in operation using said scoring model;
based on said scoring, determining which of said cells in operation are overshooting cells; and
remedying issues indicated by said scoring for said overshooting cells.

18. The method according to claim 17 wherein at least one of said multiplicity of overshooting indicators represents the number of cells that are within a coverage area for a given cell, wherein said coverage area is defined according to a proxy for distance from said given cell, wherein said proxy for distance from said given cell is in accordance with a configurable percentile for propagation delay (PD) of successful communications by said given cell with user equipments (UEs).

19. A system comprising:
an input/output (I/O) module operative to receive operational data for features associated with cell performance in a mobile network, wherein at least one of said features represents at least a relationship between a given cell and one or more tiered cells for each tier of a plurality of tiers, wherein a coverage area for said given cell is organized into tiers based on physical distance from said given cell, and wherein a first tier of said tiers begins from a first cell closest to said given cell and extends for a configurable distance, and succeeding tiers from said tiers begin from a next cell closest to a preceding tier from among said tiers and extend for said configurable distance;
processing circuitry;
a model generator application to be executed by said processing circuitry and operative to:
use at least one prediction model to analyze training sets comprising examples of values for said features for at least overshooting cells, and
to generate a scoring model for detection of said overshooting cells from among cells in said mobile network; and
a boomer detection application to be executed by said processing circuitry and operative to:
use said scoring model with said operational data to detect said overshooting cells from among cells in a mobile network,
reduce interference by said overshooting cells.

20. The system according to claim 19 wherein at least one of said features represents the number of cells that are within a coverage area for a given cell, wherein said coverage area is defined according to a proxy for distance from said given cell, wherein said proxy for distance from said given cell is in accordance with a configurable percentile for propagation delay (PD) of successful communications by said given cell with user equipments (UEs).

* * * * *